United States Patent
Sato

(10) Patent No.: US 10,583,609 B2
(45) Date of Patent: Mar. 10, 2020

(54) VERTICAL VIBRATION JOINING APPARATUS

(71) Applicant: ULTEX CORPORATION, Fukuoka-shi, Fukuoka (JP)

(72) Inventor: Shigeru Sato, Fukuoka (JP)

(73) Assignee: ULTEX CORPORATION, Fukuoka-shi, Fukuoka (JP)

( * ) Notice: Subject to any disclaimer, the term of this patent is extended or adjusted under 35 U.S.C. 154(b) by 224 days.

(21) Appl. No.: 15/680,799

(22) Filed: Aug. 18, 2017

(65) Prior Publication Data

US 2018/0050497 A1    Feb. 22, 2018

(30) Foreign Application Priority Data

Aug. 20, 2016  (JP) ................................ 2016-161592
Aug. 11, 2017  (JP) ................................ 2017-156268

(51) Int. Cl.

| | | |
|---|---|---|
| *B32B 37/00* | (2006.01) | |
| *B29C 65/08* | (2006.01) | |
| *B23K 20/10* | (2006.01) | |
| *B29C 65/00* | (2006.01) | |
| *B29C 65/78* | (2006.01) | |
| *B29K 101/12* | (2006.01) | |

(52) U.S. Cl.
CPC .............. *B29C 65/08* (2013.01); *B23K 20/10* (2013.01); *B29C 65/78* (2013.01); *B29C 66/816* (2013.01); *B29C 66/8145* (2013.01); *B29C 66/8167* (2013.01); *B29C 66/8322* (2013.01); *B29C 66/73921* (2013.01); *B29C 66/742* (2013.01); *B29K 2101/12* (2013.01)

(58) Field of Classification Search
USPC ..................................................... 156/580.1
See application file for complete search history.

(56) References Cited

U.S. PATENT DOCUMENTS

| | | | | |
|---|---|---|---|---|
| 6,202,915 | B1 * | 3/2001 | Sato ....................... | B23K 20/10 228/110.1 |
| 6,491,785 | B1 * | 12/2002 | Sato ....................... | B23K 20/10 156/358 |
| 2004/0065415 | A1 * | 4/2004 | Sato ......................... | B06B 3/00 156/580.1 |

FOREIGN PATENT DOCUMENTS

JP             9-314359 A       12/1997

OTHER PUBLICATIONS

Joint Design Technical Art; Published by Alex Corporation, Ltd., http://www.nalex.c.jp/technology/tech-wider/joint.

* cited by examiner

*Primary Examiner* — James D Sells
(74) *Attorney, Agent, or Firm* — Sughrue Mion, PLLC; Richard C. Turner

(57) ABSTRACT

In a vertical vibration joining apparatus where a resonator having a vibrator on one end side is horizontally attached to a supporting tool capable of ascending and descending, the resonator includes a cross horn of a cross shape in a front view and two boosters, the cross horn is for converting acoustic vibration transmitted from the vibrator from vibration in a lateral direction to vibration in a vertical direction orthogonal to the lateral direction, two boosters are provided at both ends of a pair of projection portions of the cross horn in the lateral direction, and portions to be supported to the supporting tool are coaxially and integrally provided on two boosters by bending outer peripheral faces of the boosters at minimum vibration amplitude points of vibration in the lateral direction resonating with the acoustic vibration transmitted from the vibrator outside in a diametrical direction to project the same annularly.

3 Claims, 6 Drawing Sheets

VERTICAL VIBRATION JOINING APPARATUS

BACKGROUND OF THE INVENTION

Field of Invention

The present invention relates to a vertical vibration joining apparatus where a resonator having a cross-shaped vibration converting portion is supported horizontally by a supporting tool capable of ascending and descending in a both-side supporting manner.

Description of the Related Art

In Item "4. Regarding how to use a vertical vibration and a lateral vibration properly" in Non-Patent Literature 1, there is such a description that vibration in a vertical direction is used for ultrasonic joining of a plurality of synthetic resin members, while vibration in a lateral direction is used for ultrasonic joining of a plurality of metal members. However, in an ultrasonic joining machine for synthetic resins, since a resonator vibrating in a vertical direction is supported in a one-side supporting manner (a cantilever manner), when a body to be joined has large portions to be joined, a large leverage force acts on the resonator, the resonator inclines, rigidity of a portion supporting the resonator in the one-side supporting manner becomes insufficient, and variation in joining occurs, which also leads to loss of vibration energy. Further, as described above, when the rigidity of the portion supporting the resonator in the one-side supporting manner is insufficient, controlling or monitoring of a joining process cannot be performed precisely. For example, even if a sensor such as a linear encoder for controlling a finished height of body to be joined at a joining time is provided, as described above, there is such a drawback that since the rigidity of the portion supporting the resonator in the one-side supporting manner is insufficient, controlling of a height position precisely or the like cannot be performed, which results in deterioration of joined quality.

BACKGROUND ART

Non-Patent Literature

Non-Patent Literature 1: "Joint Design: Technical Art [Aug. 6, 2016 searched: Internet http://www.nalex.c.jp/technology/tech-wider/joint/>] published by ALEX CORPORATION, Ltd.

BRIEF SUMMARY OF INVENTION

The present invention has been made in view of the above-described background art, and an object thereof is to provide a vertical vibration joining apparatus capable of performing joining between synthetic resin members, joining between metal members, and joining between different materials to obtain excellent joined quality.

Means for Solving Problem

According to the present invention, there is provided a vertical vibration joining apparatus where a resonator having a vibrator on one end side thereof is horizontally attached to a supporting tool capable of ascending and descending in a both-side supporting manner, wherein the resonator includes a cross horn of a cross shape in a front view and two boosters; the cross horn constitutes a vibration converting portion for converting acoustic vibration or ultrasonic vibration transmitted from the vibrator from vibration in a lateral direction causing the acoustic vibration or the ultrasonic vibration to go ahead as it is to vibration in a vertical direction orthogonal to the lateral direction; the two boosters are provided at both ends of a pair of projection portions of the cross horn in the lateral direction; and portions to be supported for supporting to the supporting tool are coaxially and integrally provided on the two boosters by bending outer peripheral faces of the boosters at minimum vibration amplitude points of the vibration in the lateral direction resonating with the acoustic vibration or the ultrasonic vibration transmitted from the vibrator outside in a diametrical direction to project the same annularly.

Advantageous Effect of Invention

According to the present invention, since the resonator is horizontally supported to the supporting tool capable of ascending and descending in the both-side supporting manner via the portions to be supported of the two boosters of the cross horn, joining such as joining between a plurality of synthetic resin members made from thermoplastic synthetic resin, joining between a plurality of metal members of the same kind or different kinds, joining between different materials composed of a metal member and a ceramic member, or joining between different materials composed of a metal member and a synthetic resin member, respectively, can be performed, and even if the body to be joined have large portions to be joined, since the resonator is horizontally attached to the supporting tool capable of ascending and descending in the both-side supporting manner, the resonator is prevented from largely inclining like the one-side supporting, which results in excellent quality of joining. In the present invention, when the pair of projection portions of the cross horn in the lateral direction and the two boosters are coaxially connected to each other by a coupling tool composed of a headless screw or a twisted bar, a connecting structure between the one cross horn and the two boosters is made simple. In the present invention, when a projection portion on a lower side of a pair of projection portions of the cross horn in the vertical direction is coaxially connected with one joining tool portion by a coupling tool composed of a headless screw or a twisted bar, a joining structure between one cross horn and one joining tool portion is made simple.

DETAILED DESCRIPTION OF THE INVENTION

Figure 1:
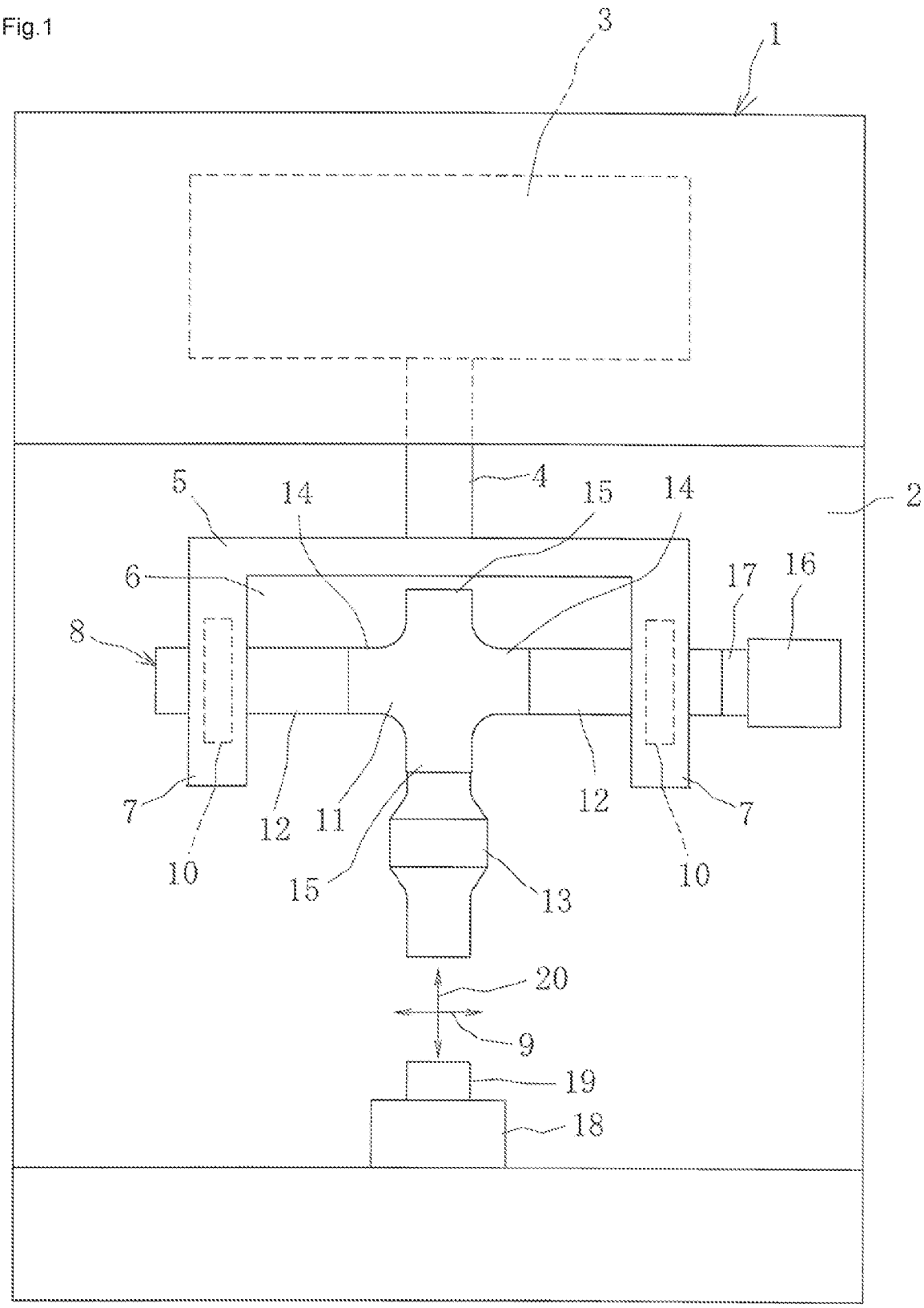
FIG. 1 is a front view of a vertical vibration joining apparatus according to an embodiment for carrying out the present invention.

With reference to FIG. 1, a vertical vibration joining apparatus 1 according to an embodiment for carrying out the invention will be explained. The vertical vibration joining apparatus 1 shown in FIG. 1 has a pressurizing mechanism 3 at an upper portion of an apparatus frame 2, and has a supporting tool 5 at an output member 4 of the pressurizing mechanism 3. The supporting tool 5 has supporting portions 7 on both sides in a lateral direction which is a left/right direction of a space portion 6 extending through in a front/rear direction and downward. Regarding the supporting tool 5, a lengthwise direction of a resonator 8 is directed to a lateral direction shown by arrow 9, portions of the resonator 8 other than portions to be supported 10 of the resonator 8 are arranged outside the space portion 6 and the supporting tool 5 such that they do not contact with the supporting tool 5, the portion to be supported 10 are supported by the supporting portions 7, and the resonator 8 is installed to the supporting tool 5. Thereby, the resonator 8 having a vibrator 16 at one end portion thereof is horizontally attached to the supporting tool 5 capable of ascending and descending in a both-side supporting manner.

The resonator 8 has a length in a lateral direction where acoustic vibration or ultrasonic vibration transmitted from the vibrator 16 resonates. As the resonator 8, one provided with one cross horn 11 of a cross shape in a front view, two boosters 12, and one joining tool portion 13 is exemplified, but one which is not provided with the joining tool portion 13 can be adopted. When the joining tool portion 13 is not provided, an end face of one on a lower side of a pair of projection portions 15 of the cross horn 11 in a vertical direction constitute the joining tool portion 13. Two boosters 12 are provided at both ends of a pair of projection portions 14 of the cross horn 11 in the lateral direction. The joining tool portion 13 is provided at a lower end of the projection portion 15 on the lower side of the pair of projection portions 15 of the cross horn 11 in the vertical direction.

The vibrator 16 is provided at one end portion of the resonator 8. Each of a portion where the cross horn 11 and the boosters 12 have been connected to each other, a portion where the booster 12 and an output end portion 17 of the vibrator 16 have been connected to each other, one end portion which is not provided with the vibrator 16 constitutes a maximum vibration amplitude point of vibration in the lateral direction resonating with acoustic vibration or ultrasonic vibration transmitted from the vibrator 16. Each of a portion where the projection portion 15 of the cross horn 11 and the joining tool portion 13 have been connected to each other, and a lower end portion of the joining tool portion 13 constitutes a maximum vibration amplitude point of vibration in the vertical direction resonating with the acoustic vibration or the ultrasonic vibration transmitted from the vibrator 16. A receiving portion 18 is provided to be located at a position just below the joining tool portion 13 at a lower portion of the apparatus frame 2.

When joining of a body to be joined 19 is performed by the vertical vibration joining apparatus 1 shown in FIG. 1, the body to be joined 19 is placed on the receiving portion 18 in a state where the joining tool portion 13 and the receiving portion 18 form a space allowing insertion of the body to be joined 19 in cooperation with each other to be opposed to each other in the vertical direction. Next, according to lowering of the output member 4 occurring from driving of the pressurizing mechanism 3, the body to be joined 19 is clamped from the top and bottom thereof by the joining tool portion 13 and the receiving portion 18 to be pressurized, the resonator 8 resonates with the acoustic vibration or the ultrasonic vibration transmitted from the vibrator 16, a lower face of the joining tool portion 13 vibrates in a vertical direction shown by arrow 20, and portions to be joined of the body to be joined 19 receive pressurizing and vibration energy to be joined to each other. Thereafter, according to rising of the output member 4 occurring from driving of the pressurizing mechanism 3, the joining tool portion 13 is separated from the body to be joined 19, so that the body to be joined 19 is left on the receiving portion 18. The body to be joined 19 left on the receiving portion 18 is taken out of the receiving portion 18, so that one joining action to the body to be joined 19 is terminated.

As the body to be joined 19, a configuration of joining between resins where a plurality of synthetic resin members made of thermoplastic synthetic resin have been stacked to one another, a configuration of joining between metals where a plurality of metal members of the same kind or different kinds have been stacked to one another, a configuration of joining between different materials where a resin pad(s) has been (have been) stacked to one or both of an upper side and a lower side of a plurality of metal members of the same kind or different kinds, a configuration of joining between different materials where a metal member and a ceramic member stacked to each other, a configuration of joining between different materials where a resin pad(s) has been (have been) stacked to one or both of an upper side and a lower side of a metal member and a ceramic member stacked to each other, a configuration of joining between different materials where a metal member and a synthetic rein member have been stacked to each other, a configuration of joining between different materials where a resin pad(s) has been (have been) stacked to one or both of an upper side and a lower side of a metal member and a synthetic resin member stacked to each other, and the like can be adopted. In addition, as a shape of the body to be joined 19, various shapes such as a square shape, a circular shape, an irregular shape in a plan view, and the like can be used. That is, according to the vertical vibration joining apparatus 1 shown in FIG. 1, joining between synthetic resin members, joining between metal members, and joining between different materials are made possible.

According to the vertical vibration joining apparatus 1 shown in FIG. 1, since the resonator 8 is horizontally supported to the supporting tool 5 capable of ascending and descending in the both-side supporting manner via the portions to be supported of the two boosters 2 of the cross horn 1, joining of body to be joined 19 having the configuration of joining between resins where a plurality of synthetic resin members made of thermoplastic synthetic resin have been stacked to one another, the configuration of joining between metals where a plurality of metal members of the same kind or different kinds have been stacked to one another, the configuration of joining between different materials where a resin pad(s) has been (have been) stacked to one or both of an upper side and a lower side of a plurality of metal members of the same kind or different kinds, the configuration of joining between different materials where a metal member and a ceramic member have been stacked to one another, the configuration of joining between different materials where a resin pad(s) has been (have been) stacked to one or both of an upper side and a lower side of a metal member and a ceramic member stacked to each other, the configuration of joining between different materials where a metal member and a synthetic rein member have been stacked to each other, and the configuration of joining between different materials where a resin pad(s) has been (have been) stacked to one or both of an upper side and a lower side of a metal member and a synthetic resin member stacked to each other can be performed, and even if the body to be joined 19 has large portions to be joined, since the resonator 8 is horizontally attached to the supporting tool 5 capable of ascending and descending in the both-side supporting manner, the resonator 8 is prevented from largely inclining like an one-side supporting, which results in excellent quality of joining.

In FIG. 1, the structure where the pressurizing mechanism 3, the supporting tool 5 and the resonator 8 are arranged on the upper portion of the apparatus frame 2, and the receiving portion 18 are arranged on a lower portion of the apparatus frame 2 has been exemplified, but a structure where the pressurizing mechanism 3 and the receiving portion 18 are arranged on the upper portion of the apparatus frame 2, and the supporting tool 5 and the resonator 8 are arranged on a lower portion of the apparatus frame 2 can also be adopted. The weight of the resonator 8 using acoustic vibration for joining and composed of one cross horn 11, two boosters 12 and one joining tool portion 13 is considerably heavier than the weight of the resonator 8 using ultrasonic vibration for joining and composed of one cross horn 11, two boosters 12 and one joining tool portion 13. Therefore, when the acoustic vibration is used for joining, a structure where the receiving portion 18 is attached to the output portion 4 of the pressurizing mechanism 3 provided on the upper portion of the apparatus frame 2, and the supporting tool 5 supporting the resonator 8 in the both-side supporting manner is provided on a lower portion of the apparatus frame 2 can be adopted.

Members constituting the resonator 8 according to the embodiment for carrying out the invention shown in FIG. 2 will be explained. As each of a distance between end faces of the pair of projection portions 14 of the cross horn 11 shown in FIG. 2 in the lateral direction, and a distance between end faces of the pair of projection portions 15 of the cross horn 11 in the vertical direction, a length of ½ wavelength of the acoustic vibration or the ultrasonic vibration transmitted from the vibrator 16 or a length of an odd integral multiple of the length of ½ wavelength can be adopted, but when the distance is the length of ½ wavelength, the cross horn 11 is made small in the vertical and the lateral directions.

The cross horn 11 constitutes a vibration converting portion for converting acoustic vibration or ultrasonic vibration transmitted from the vibrator 16 from vibration in a lateral direction causing the acoustic vibration or the ultrasonic vibration to go ahead as it is to vibration in a vertical direction orthogonal to the lateral direction. A central portion of intersecting the vibration in the lateral direction resonating with the acoustic vibration or the ultrasonic vibration transmitted from the vibrator 16 of the cross horn 11 and the vibration in the vertical direction obtained by conversion from the vibration in the lateral direction to the vibration in the vertical direction with each other constitutes a minimum vibration amplitude point. The end faces of the pair of projection portions 14 of the cross horn 11 in the lateral direction constitute maximum vibration amplitude points of the vibration in the lateral direction resonating with the acoustic vibration or the ultrasonic vibration transmitted from the vibrator 16. The end faces of the pair of projection portions 15 of the cross horn 11 in the vertical direction constitute a maximum vibration amplitude points of the vibration in the vertical direction obtained by converting vibration in the lateral direction resonating with the acoustic vibration or the ultrasonic vibration transmitted from the vibrator 16 to vibration in the vertical direction. In short, the sizes of the cross horn 11 in the vertical direction and the lateral direction should be set such that the end faces of the pair of projection portions 14 and the end faces of the pair of projection portions 15 of the cross horn 11 constitute the maximum vibration amplitude points, the central portion of the cross horn 11 in the lateral direction constitutes the minimum vibration amplitude point and the intersecting portion of the vibration in the vertical direction with the central portion of the vibration in the lateral direction constitutes the minimum vibration amplitude point, or the end faces of the pair of projection portions 14 and the end faces of the pair of projection portions 15 of the cross horn 11 constitute the maximum vibration amplitude points, the central portion of the cross horn 11 in the vertical direction constitutes the minimum vibration amplitude point and the intersecting portion of the vibration in the lateral direction with the central portion of the vibration in the vertical direction constitutes the minimum vibration amplitude point.

The case where the size of the booster 12 in the lateral direction has a length of ½ wavelength of the acoustic vibration or the ultrasonic vibration transmitted from the vibrator 16 or an integral multiple of the length of ½ wavelength thereof can also be adopted, but when the size of the booster 12 in the lateral direction has the length of the ½ wavelength, the booster 12 is small-sized in the lateral direction. The end faces of the booster 12 in the lateral direction constitute the maximum vibration amplitude points. The portion where the cross horn 11 and the booster 12 have been connected to each other constitutes the maximum vibration amplitude point. The booster 12 is coaxially and integrally provided with the portion to be supported 10 by bending an outer peripheral face of the booster 12 at the maximum vibration amplitude point outside in a diametrical direction to project the same annularly. In short, the size of the booster 12 in the lateral direction should be set such that the end face of the booster 12 in the lateral direction constitutes the maximum vibration amplitude point.

The outer peripheral face of the portion to be supported 10 constitutes one circle going around the center of the booster 12 with one radius. Since the outer peripheral face of the portion to be supported 10 constitutes the one circle going around the center of the booster 12 with one radius, even when the two boosters 12 are connected to both sides of the cross horn 11 by the coupling tools 21 composed of a headless screw or a twisted bar, the end face of the joining tool portion 13 on the lower side provides an aspect where it always becomes parallel to the upper face of the receiving portion 18 to make it possible to perform even pressurizing to the body to be joined 19 shown in FIG. 1. Since the pair of projection portions 14 of the cross horn 11 in the lateral direction and the two boosters 12 are coaxially connected to each other by the coupling tools 21 composed of a headless screw or a twisted bar, the connecting structure between the one cross horn 11 and the two boosters 12 is simplified.

The end face of the projection portion 15 on the lower side of the cross horn 11 in the vertical direction is coaxially and integrally connected with the joining tool portion 13 by a coupling tool composed of a headless screw or a twisted bar in the vertical direction. The case where the size of the coupling tool 13 in the vertical direction has a length of ½ wavelength of the acoustic vibration or the ultrasonic vibration transmitted from the vibrator 16 or an integral multiple thereof can be adopted, but when the size has the length of ½ wavelength, the joining tool portion 13 is size-reduced in the vertical direction. The end face of the joining tool portion 13 in the vertical direction constitutes the maximum vibration amplitude point. The portion where the cross horn 11 and the joining tool portion 13 have been connected to each other constitutes the maximum vibration amplitude point. In short, the size of the joining tool portion 13 in the vertical direction should be set such that the end face of the joining tool portion 13 in the vertical direction constitutes the maximum vibration amplitude point.

As the end face of the joining tool portion 13 on the lower side, such a shape as a circular shape, a square shape, a triangular shape, an elliptical shape, and an irregular shape adapting to the body to be joined 19 can be adopted so as to perform even pressurization to the body to be joined 19. Since the projection portion 15 on the lower side of the pair of projection portions 15 of the cross horn 11 in the vertical direction is coaxially connected with the one joining tool portion 13 by the coupling tool 22 composed of a headless screw or a twisted bar, the connecting structure between one cross horn 11 and one joining tool portion 13 is simplified One end portion of the one booster 12 located on the opposite side of the cross horn 11 is coaxially and integrally connected with the vibrator 16 in the lateral direction by a coupling tool 23 composed of a headless screw or a twisted bar. An intermediate booster (not shown) may be coaxially and integrally connected in the lateral direction between the one booster 12 and the vibrator 16, between the cross horn 11 and the booster 12, or between the cross horn 11 and the joining tool portion 13 by such a coupling tool (not shown) composed of a headless screw or a twisted bar. The intermediate booster is for adjusting the amplitude of vibration of the resonator 8. By changing a magnitude (a shape) of the intermediate booster, the amplitude of vibration obtained by the resonator 8 can also be made large or small. When the intermediate booster is not used, the amplitude of vibration obtained by the resonator 8 is an amplitude of vibration obtained by the vibrator 16, namely, one time. However, an intermediate booster having an amplitude of one time may be used.

Figure 3:
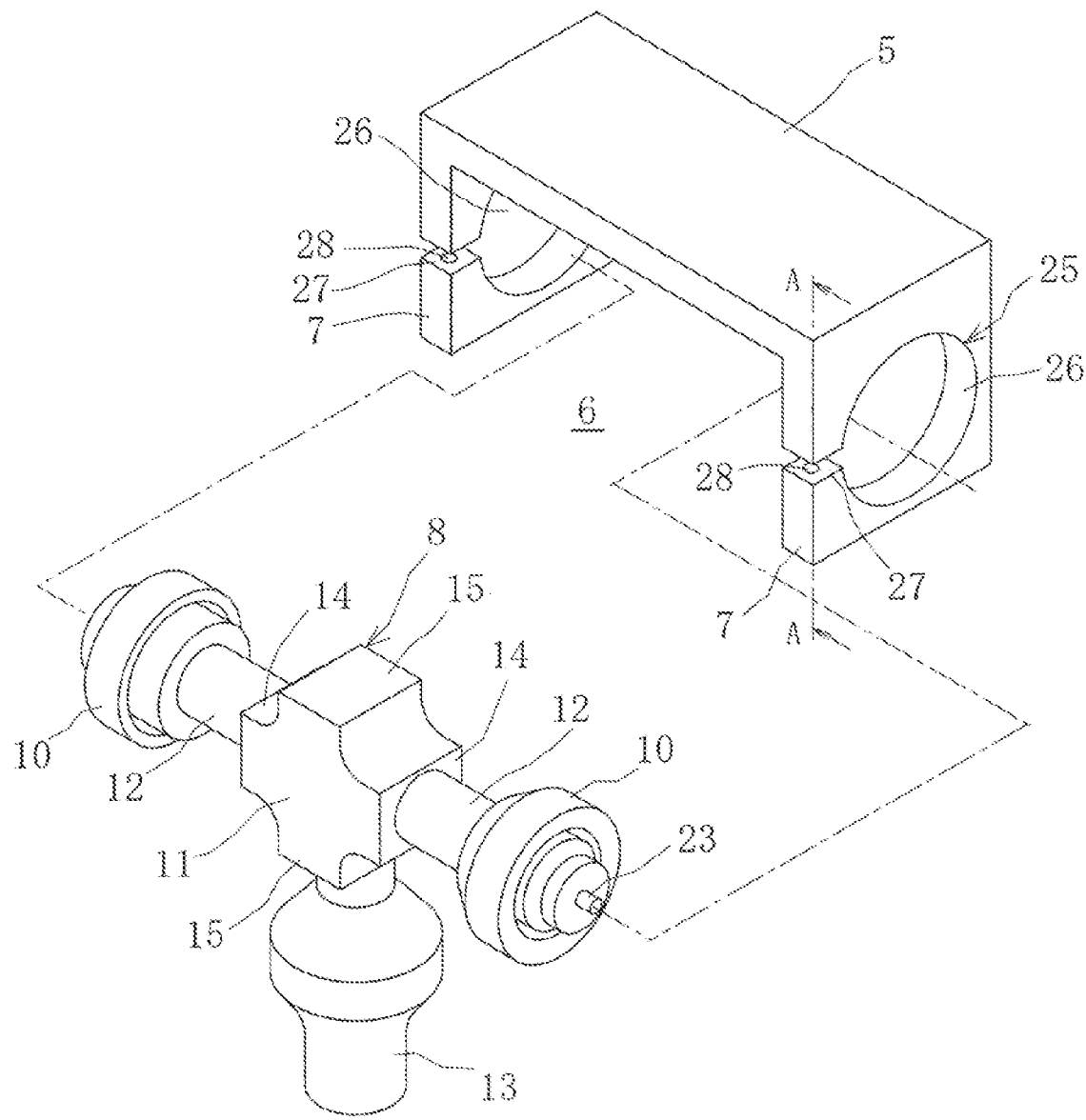
FIG. 3 is a perspective view of a mechanical locking mechanism according to the embodiment for carrying out the present invention.
Figure 4:
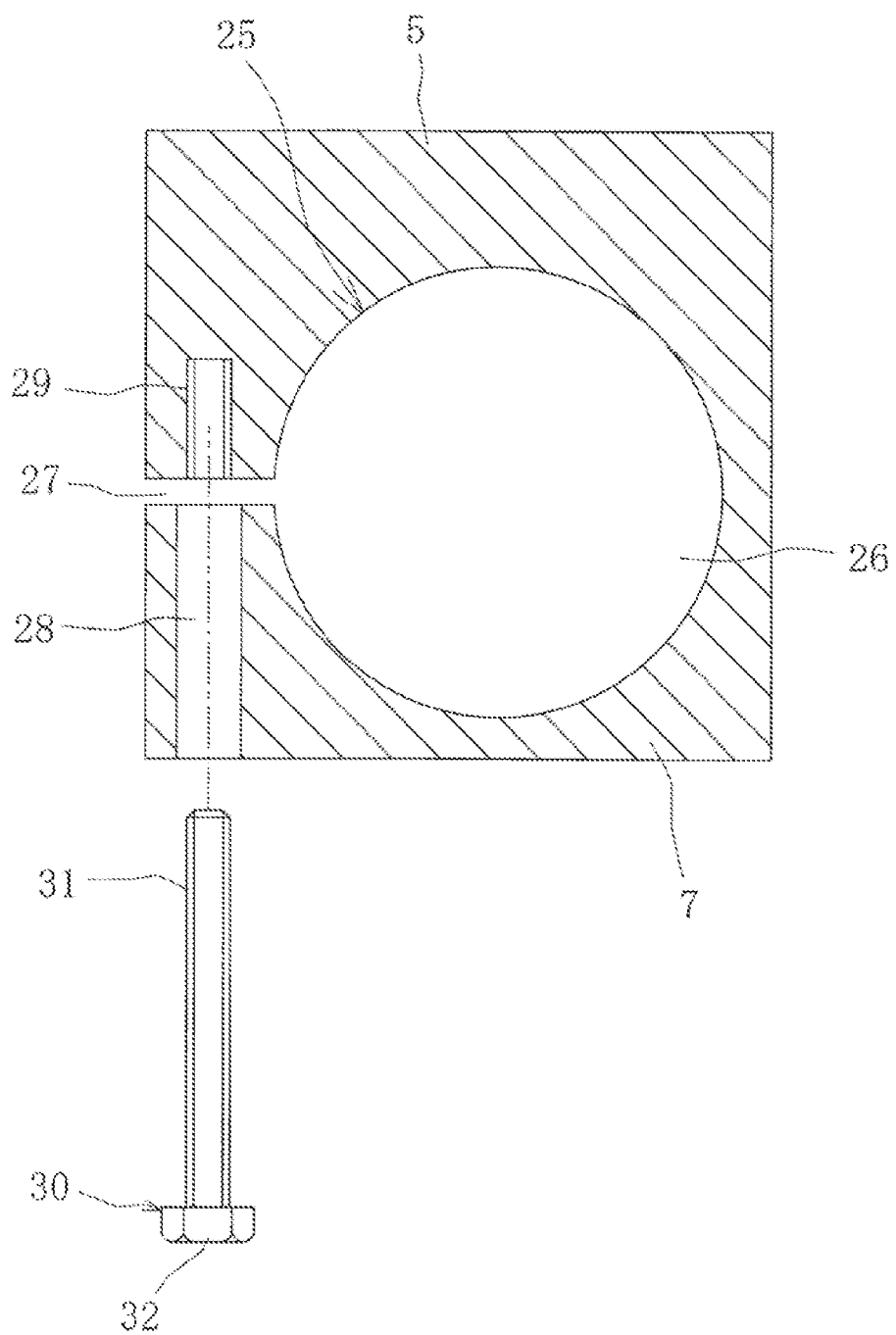
FIG. 4 is a sectional view taken along line A-A in FIG. 3

With reference to FIGS. 3 and 4, a mechanical locking mechanism 25 for attaching the resonator 8 to the supporting tool 5 according to the embodiment for carrying out the invention will be explained. The mechanical locking mechanism 25 shown in FIGS. 3 and 4 is described on paragraph [0010] and FIGS. 5 and 6 in Japanese Patent No. 2911394 Publication. As shown in FIGS. 3 and 4, the mechanical locking mechanism 25 is provided with attaching holes 26, expanding slots 27, screw-inserting holes 28, screw holes 29, and headed bolts 30. The attaching holes 26 are coaxially and laterally provided in the pair of supporting portions 7 of the supporting tool 5 so as to extend through the pair of supporting portions 7 in the lateral direction as holes for attaching the portion to be supported 10 of the resonator 8. The diameters of these attaching holes 26 can be varied by the expanding slots 27 formed in portions of the supporting portions 7 surrounding the attaching holes 26.

As shown in FIG. 4, the screw inserting hole 28 is provided in the portion of the supporting portion 7 surrounding the attaching hole 26 on a lower side of the expanding slot 27 such that the center thereof faces in a vertical direction. An upper portion of the screw hole 28 extends through the expanding slot 27. The screw hole 29 is also provided in another portion of the supporting portion 7 surrounding the attaching hole 26 on an upper side of the expanding slot 27 so as to be opposed to the screw inserting hole 28 in the vertical direction. Therefore, a male screw portion 31 of the headed bolt 30 is attached to a female screw portion of the screw hole 29 from the lower side via the screw inserting hole 28 and the expanding slot 27, and the a peripheral portion of the screw inserting portion 28 of the supporting portion 7 is pushed up by a head portion 32 of the headed bolt 30, so that a clearance of the expanding slot 27 in the vertical direction is narrowed, the diameter of the attaching hole 26 is reduced, and the portion to be supported 10 of the resonator 8 arranged in the attaching hole 26 is held by the supporting portion 7.

According to the mechanical locking mechanism 25 shown in FIGS. 3 and 4, the portion to be supported 10 of the resonator 8 is inserted into the attaching hole 26 such that the outer peripheral face of the portion to be supported 10 of the resonator 8 is opposed to the portion of the supporting portion 7 surrounding the attaching hole 26 in a state where the diameter of the screw attaching hole 26 is not reduced by the headed bolt 30. An aspect where, according to an unnatural fastening operation of the headed bolt 30 to the supporting portion 7 such that an advancing amount of the male screw portion 31 of the headed bolt 30 into the screw hole 29 is increased in a state where the end face of the joining tool portion 13 on the lower side has been made parallel to the upper face of the receiving portion 18 shown in FIG. 1 by contacting of the end face of the joining tool portion 13 on the lower side with the upper face of the receiving portion 18, the portion of the supporting portion 7 located around the screw inserting hole 28 is pushed up by the head portion 32 of the headed bolt 30, the portion to be supported 10 of the resonator 8 arranged inside the attaching hole 26 is held by the supporting portion 7 and the end face of the joining tool portion 13 on the lower side is always made parallel to the upper face of the receiving portion 18 can be provided.

Figure 5:
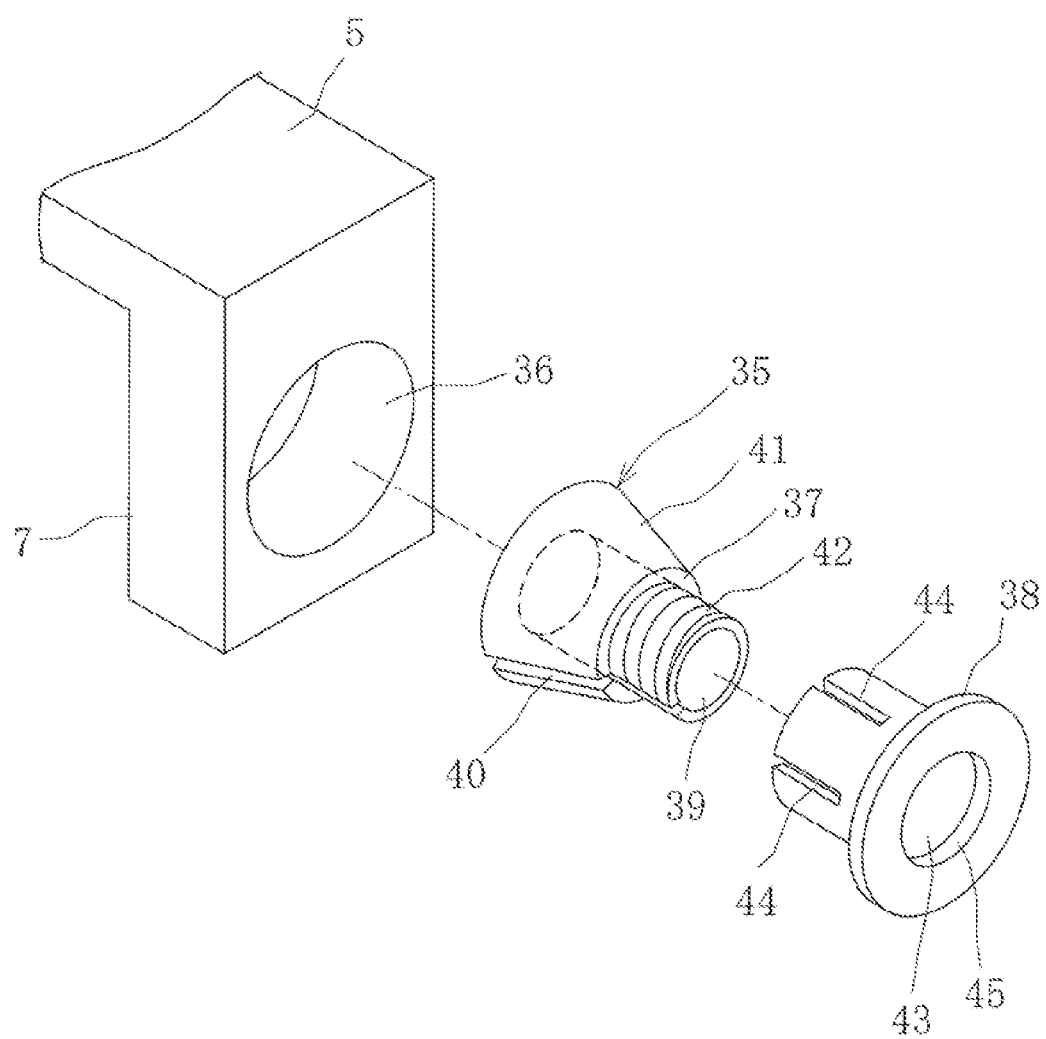
FIG. 5 is a perspective view of another mechanical locking mechanism according to the embodiment for carrying out the present invention.
Figure 6:
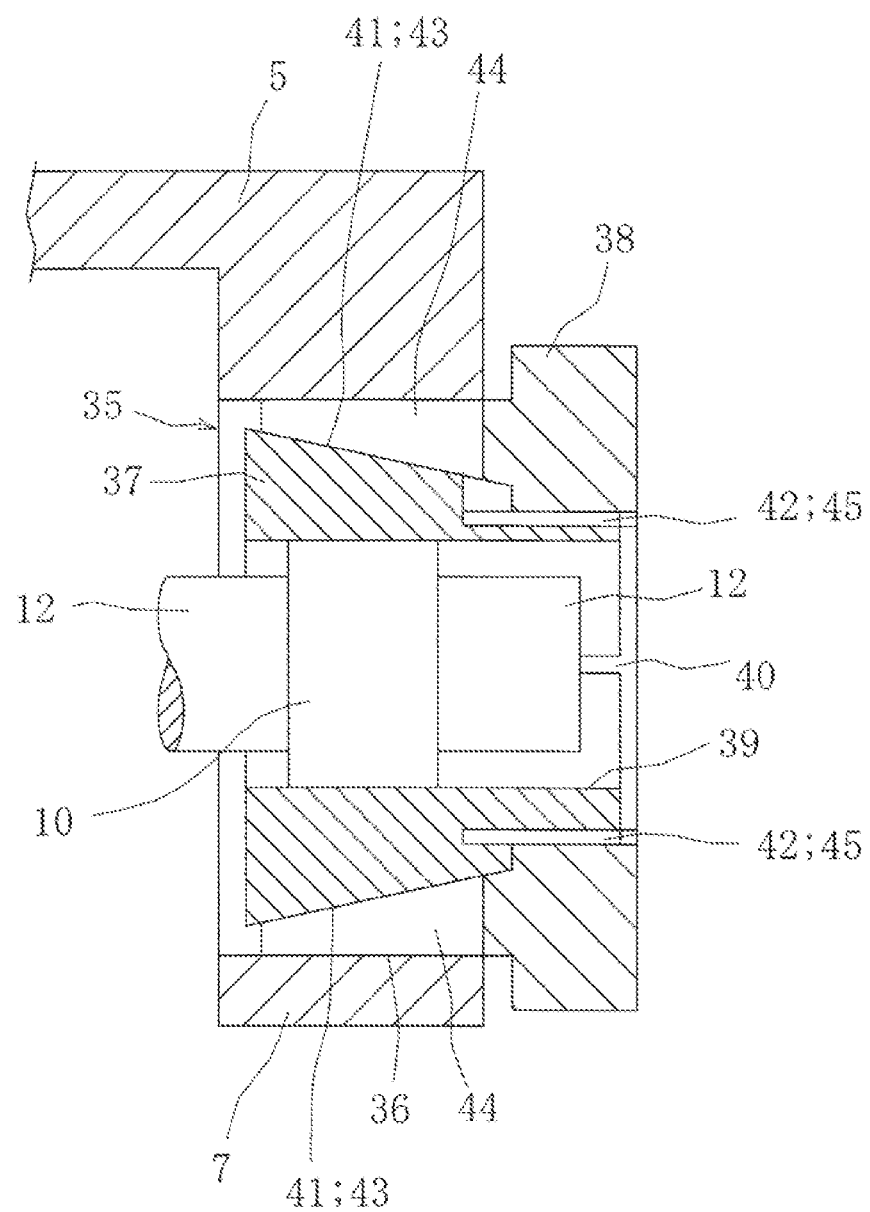
FIG. 6 is a vertical sectional view in FIG. 5.

With reference to FIGS. 5 and 6, another mechanical locking mechanism 35 for attaching the resonator 8 to the supporting tool 5 for carrying out the invention will be explained. The mechanical locking mechanism 35 shown in FIGS. 5 and 6 is similar to a mechanical locking mechanism described on paragraphs [0010] to [0020] and FIG. 2 to FIG. 4 in Japanese Patent No. 2934602 publication. In FIGS. 5 and 6, one supporting portion 7 of a pair of supporting portions 7 and the mechanical locking mechanism 35 used in the one supporting portion 7 are shown, but the other supporting portion 7 and a mechanical locking mechanism 35 used in the other supporting portion 7 are not shown.

As shown in FIGS. 5 and 6, the mechanical locking mechanism 35 is provided with an attaching hole 36, a wedge inner cylinder 37, and a wedge outer cylinder 38. The attaching holes 36 are coaxially provided in the pair of supporting portions 7 of the supporting tool 5 in the lateral direction so as to extend through the supporting portions 7 in the lateral direction as holes for attaching the portions to be supported 10 of the resonator 8 to the pair of supporting portions 7 of the supporting tool 5.

The wedge inner cylinder 37 is provided with an inner hole 39 provided so as to extend through a central portion of the wedge inner cylinder 37 in the lateral direction to receive the portion to be supported 10, an expanding slot 40 provided at a portion of the wedge inner cylinder 37 surrounding the inner hole 39 so as to be capable of varying the diameter of the inner hole 39, a wedge portion 41 provided on one end side of an outer peripheral face of the wedge inner cylinder 37 in the lateral direction, and a male screw portion 42 provided on the other end side of the outer peripheral face of the wedge inner cylinder 37 in the lateral direction. An outer diameter of the wedge portion 41 is made gradually larger from the side of the male screw portion 42 toward the one end side of the wedge inner cylinder 37.

The wedge outer cylinder 38 is provided with a wedge portion 43 provided on one end side of a central portion of the wedge outer cylinder 38 in the lateral direction, expanding slots 44 provided at a portion of the wedge outer cylinder 38 surrounding the wedge portion 43 so as to be capable of varying the diameter of the wedge portion 43, and a female screw portion 45 provided on the other end side of the central portion of the wedge outer cylinder 38 in the lateral direction so as to be capable of be attached to the male screw portion 42 of the wedge inner cylinder 37.

According to the mechanical locking mechanism 35 shown in FIGS. 5 and 6, the portion to be supported 10 of the resonator 8 is inserted into the attaching hole 36 such that the outer peripheral face of the portion to be supported 10 of the resonator 8 is opposed to the portion of the supporting portion 7 surrounding the attaching hole 36, and the male screw portion 42 of the wedge inner cylinder 37 is screwed to the female screw portion 45 from one end side of the wedge outer cylinder 38 via the wedge portion 43. The wedge outer cylinder 38 is unnaturally fastened to the wedge inner cylinder 37 such that an advancing amount of the female screw 45 of the wedge outer cylinder 38 into the male screw portion 42 of the wedge inner cylinder 37 is increased in a state where the end face of the joining tool portion 13 on the lower side has been made parallel to the upper face of the receiving portion 18 shown in FIG. 1 by contacting of the end face of the joining tool portion 13 on the lower side with the upper face of the receiving portion 18. Thereby, an aspect where the diameter of the inner hole 39 of the wedge inner cylinder 37 is reduced so as to narrow a width defined by both edges of the expanding slot 40 of the wedge inner cylinder 37 opposed in a circumferential direction by an external force which the wedge outer cylinder 38 receives from the portion of the supporting portion 7 surrounding the attaching hole 36 and which acts toward the center side of the attaching hole 36 and a wedge action obtained by the wedge portions 41 and 43, the portion to be supported 10 of the resonator 8 is held by the supporting portion 7, and the end face of the joining tool portion 13 on the lower side is always made parallel to the upper face of the receiving portion 18 can be provided.

The mechanical locking mechanism 35 shown in FIGS. 5 and 6 is configured such that it is provided with the attaching hole 36 provided in the supporting portion 7, the wedge outer cylinder 38 fitted into the attaching hole 36 in an inscribed manner, the wedge portion 43 provided on the wedge outer cylinder 38, the female screw portion 45 provided on the wedge outer cylinder 38, the wedge inner cylinder 37 fitted to the wedge outer cylinder 38 in an inscribing manner and having the inner hole 39 fitted with the portion to be supported 10 of the resonator 8 in an inscribing manner, the wedge portion 41 provided on the wedge inner cylinder 37, and the male screw portion 42 provided on the wedge inner cylinder 37, the inner diameter of the inner hole 39 is reduced by the wedge outer cylinder 38 with the external force acting in a pressing and reducing direction received from the portion of the supporting portion 7 surrounding the attaching hole 36 and the wedge action obtained by the wedge portions 41 and 43 according to a rotational operation in a fastening direction for attaching the male screw portion 42 and the female screw portion 45 to each other, and the portion to be supported 10 of the resonator 8 is held by the supporting portion 7.

Figure 2:
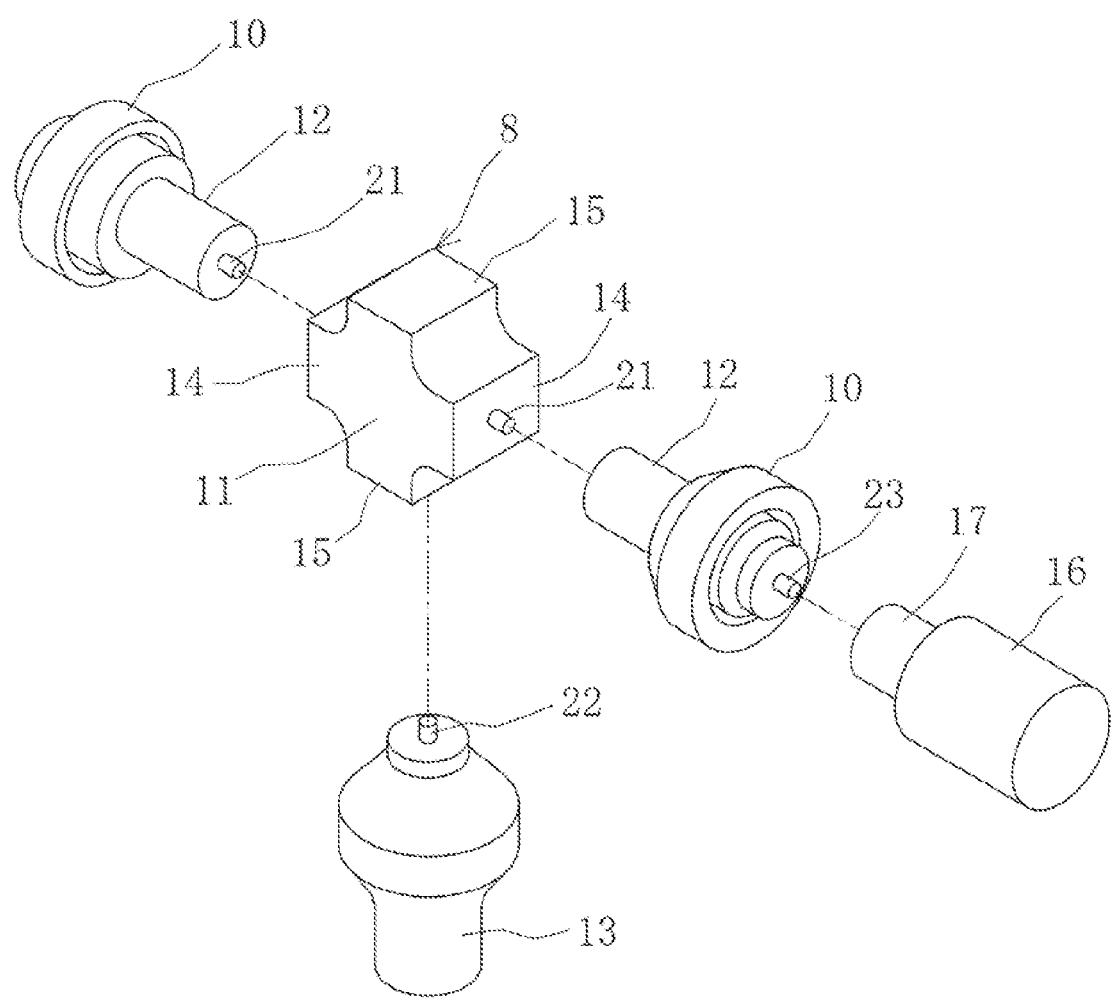
FIG. 2 is an exploded perspective view of a resonator according to the embodiment for carrying out the present invention.

Instead of the mechanical locking mechanism 35 shown in FIGS. 5 and 6, the mechanical locking mechanism described on paragraphs [0010] to [0020] and FIGS. 2 to 4 in Japanese Patent No. 2934602 Publication may be used.

What is claimed is:

1. A vertical vibration joining apparatus where a resonator having a vibrator on one end side thereof is horizontally attached to a supporting tool capable of ascending and descending in a both-side supporting manner, wherein
    the resonator comprises a cross horn of a cross shape in a front view and two boosters,
    the cross horn constitutes a vibration converting portion for converting acoustic vibration or ultrasonic vibration transmitted from the vibrator from vibration in a lateral direction to vibration in a vertical direction orthogonal to the lateral direction;
    the two boosters are provided at both ends of a pair of projection portions of the cross horn in the lateral direction; and
    portions to be supported by the supporting tool are coaxially and integrally provided on respective annular radial projection regions of the two boosters at minimum vibration amplitude points of the vibration in the lateral direction resonating with the acoustic vibration or the ultrasonic vibration transmitted from the vibrator.

2. The vertical vibration joining apparatus according to claim 1, wherein the pair of projection portions of the cross horn in the lateral direction and the two boosters are coaxially connected to each other by coupling tools composed of a headless screw or a twisted bar.

3. The vertical vibration joining apparatus according to claim 1, wherein a projection portion on a lower side of a pair of projection portions of the cross horn in a vertical direction is coaxially connected with one joining tool portion by a coupling tool composed of a headless screw or a twisted bar.

* * * * *